(12) United States Patent
Kritt et al.

(10) Patent No.: US 10,248,823 B2
(45) Date of Patent: Apr. 2, 2019

(54) USE OF SECURITY INK TO CREATE METADATA OF IMAGE OBJECT

(71) Applicant: International Business Machines Corporation, Armonk, NY (US)

(72) Inventors: Barry A. Kritt, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/505,213

(22) Filed: Oct. 2, 2014

(65) Prior Publication Data

US 2015/0199551 A1  Jul. 16, 2015

Related U.S. Application Data

(63) Continuation of application No. 14/154,796, filed on Jan. 14, 2014, now abandoned.

(51) Int. Cl.
| | |
|---|---|
| *G06K 7/12* | (2006.01) |
| *G06K 9/18* | (2006.01) |
| *G06K 9/52* | (2006.01) |
| *B64D 5/00* | (2006.01) |
| *H04N 1/21* | (2006.01) |

(Continued)

(52) U.S. Cl.
CPC ........... *G06K 7/12* (2013.01); *B64D 5/00* (2013.01); *G06K 9/18* (2013.01); *G06K 9/52* (2013.01); *G06K 19/0614* (2013.01); *G07D 7/00* (2013.01); *H04N 1/2112* (2013.01)

(58) Field of Classification Search
CPC .. G06K 7/12; G06K 9/18; G06K 9/52; H04N 7/18
See application file for complete search history.

(56) References Cited

U.S. PATENT DOCUMENTS

| | | | |
|---|---|---|---|
| 6,397,184 B1 * | 5/2002 | Walker | G03B 31/06 396/312 |
| 6,556,690 B1 * | 4/2003 | Nelson | G06K 7/10544 235/468 |
| 7,213,757 B2 | 5/2007 | Jones et al. | |

(Continued)

OTHER PUBLICATIONS

Anders, "Do you know what your invisible ink says?," downloaded from <http://www.tpcug.org/newsletter/nl_2000/november2000/invisible_ink.htm> on Jan. 14, 2014.

*Primary Examiner* — Thien M Le
*Assistant Examiner* — Asifa Habib
(74) *Attorney, Agent, or Firm* — Joseph J. Petrokaitis; Gregory K. Goshorn; Greg Goshorn, P.C.

(57) ABSTRACT

Provided are techniques for the placement of a code on an object that does not interfere and is not displayed in a captured visual image of the object. Also provided are techniques for capturing a first image of an object in the visual light spectrum; capturing a second image of the object in a non-visual light spectrum; extracting metadata, stored in the non-visual light spectrum corresponding to the object from the second image; and storing the first image in conjunction with the metadata. Also provided are techniques for storing the metadata in conjunction with the object in the non-visual light spectrum, wherein the metadata is stored in a quick response (QR) code or a bar code and the non-visible light spectrum is ultraviolet light or infrared light.

20 Claims, 4 Drawing Sheets

(51) Int. Cl.
*G06K 19/06* (2006.01)
*G07D 7/00* (2016.01)

(56) References Cited

U.S. PATENT DOCUMENTS

| | | | | |
|---|---|---|---|---|
| 7,229,025 B2* | 6/2007 | Sussmeier | ............... | G06K 7/12 235/462.02 |
| 7,520,443 B2 | 4/2009 | Kamijoh et al. | | |
| 8,123,134 B2 | 2/2012 | Reed et al. | | |
| 8,259,342 B2* | 9/2012 | Kamijoh | ............... | H04N 1/3871 358/1.18 |
| 9,070,057 B2* | 6/2015 | Hamilton | ............... | G03B 7/00 |
| 2002/0063744 A1* | 5/2002 | Stephens, Jr. | .......... | G06K 1/121 347/19 |
| 2002/0070281 A1* | 6/2002 | Nimura | ................. | G06K 7/12 235/494 |
| 2002/0090112 A1* | 7/2002 | Reed | ................. | G06F 17/30876 382/100 |
| 2002/0141750 A1* | 10/2002 | Ludtke | ................ | G03B 17/24 396/312 |
| 2002/0158137 A1* | 10/2002 | Grey | ................ | G06K 7/12 235/494 |
| 2007/0291303 A1* | 12/2007 | Tanaka | .............. | H04N 1/00204 358/1.15 |
| 2009/0240695 A1* | 9/2009 | Angell | ............. | G06F 17/30781 |
| 2011/0079639 A1* | 4/2011 | Khan | ................. | H04N 1/00326 235/375 |
| 2011/0299857 A1* | 12/2011 | Rekimoto | .............. | G03B 21/26 398/172 |
| 2012/0145788 A1* | 6/2012 | Horn | ................. | G06K 7/10574 235/462.07 |
| 2012/0273562 A1* | 11/2012 | Cardoso | ............ | G06F 17/30725 235/375 |
| 2013/0015236 A1* | 1/2013 | Porter | ................ | G06F 21/645 235/375 |
| 2013/0048850 A1* | 2/2013 | Vinogradov | ....... | G06K 7/10732 250/271 |
| 2013/0099109 A1* | 4/2013 | Kao | ........................ | G06K 7/12 250/271 |
| 2013/0161387 A1* | 6/2013 | King | ....................... | G07D 7/00 235/431 |
| 2013/0320094 A1* | 12/2013 | Slusar | ................... | G06F 3/0304 235/487 |
| 2014/0105449 A1* | 4/2014 | Caton | .................... | G06F 21/34 382/100 |
| 2015/0095757 A1* | 4/2015 | Kamata | ............ | G06F 17/30179 715/234 |
| 2015/0199551 A1* | 7/2015 | Kritt | ....................... | G06K 7/12 235/375 |
| 2016/0078333 A1* | 3/2016 | Simske | ................... | G06K 1/123 235/462.04 |

* cited by examiner

USE OF SECURITY INK TO CREATE METADATA OF IMAGE OBJECT

CROSS-REFERENCES TO RELATED APPLICATIONS

The present application is a continuation and claims the benefit of the filing date of an application entitled, "Use of Invisible Ink to Create Metadata of Image Object" Ser. No. 14/154,796, filed Jan. 14, 2014, assigned to the assignee of the present application, and herein incorporated, by reference

FIELD OF DISCLOSURE

The claimed subject matter relates generally to the display of images and, more specifically, to a techniques for providing metadata in conjunction with a visual representation of an object without changing the visual representation of the object.

BACKGROUND OF THE INVENTION

Many objects include, either on the surface or on labels attached to the surface, a code that provides information on the object. Examples include, but are not limited to, a bar code and a Quick Response (QR) code, also known as a 2D code. Information stored in such codes may include such data as a description of the corresponding physical object, the year that the object, was made, the material used, a manufacturer and so on. These codes are typically read by a scanner, a mobile telephone or other objects. However, when a picture is take of an object, with such an attached code, the code is included in the captured image.

"Invisible" ink, also known as "security" ink, is a substance used for printing that is not normally visible in the visual light spectrum. Such ink is typically only visible when illuminated by a high intensity light in a non-visual light spectrum such as, but not limited to, ultraviolet and infrared wavelengths. In addition, some types of viewing devices may be employed to view invisible ink, either with or without any special illumination. Invisible ink has been used to store metadata and confidential data in documents.

SUMMARY

Provided are techniques for the placement of a code on an object that does not interfere and is not displayed in a captured visual image of the object. Also provided are techniques for capturing a first image of an object in the visual light spectrum; capturing a second image of the object in a non-visual light spectrum; extracting metadata, stored in the non-visual light spectrum corresponding to the object from the second image; and storing the first image in conjunction with the metadata. Also provided are techniques for storing the metadata in conjunction with the object in the non-visual light spectrum, wherein the metadata is stored in a quick response (QR) code or a bar code and the non-visible light spectrum is ultraviolet light or infrared light.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination, of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
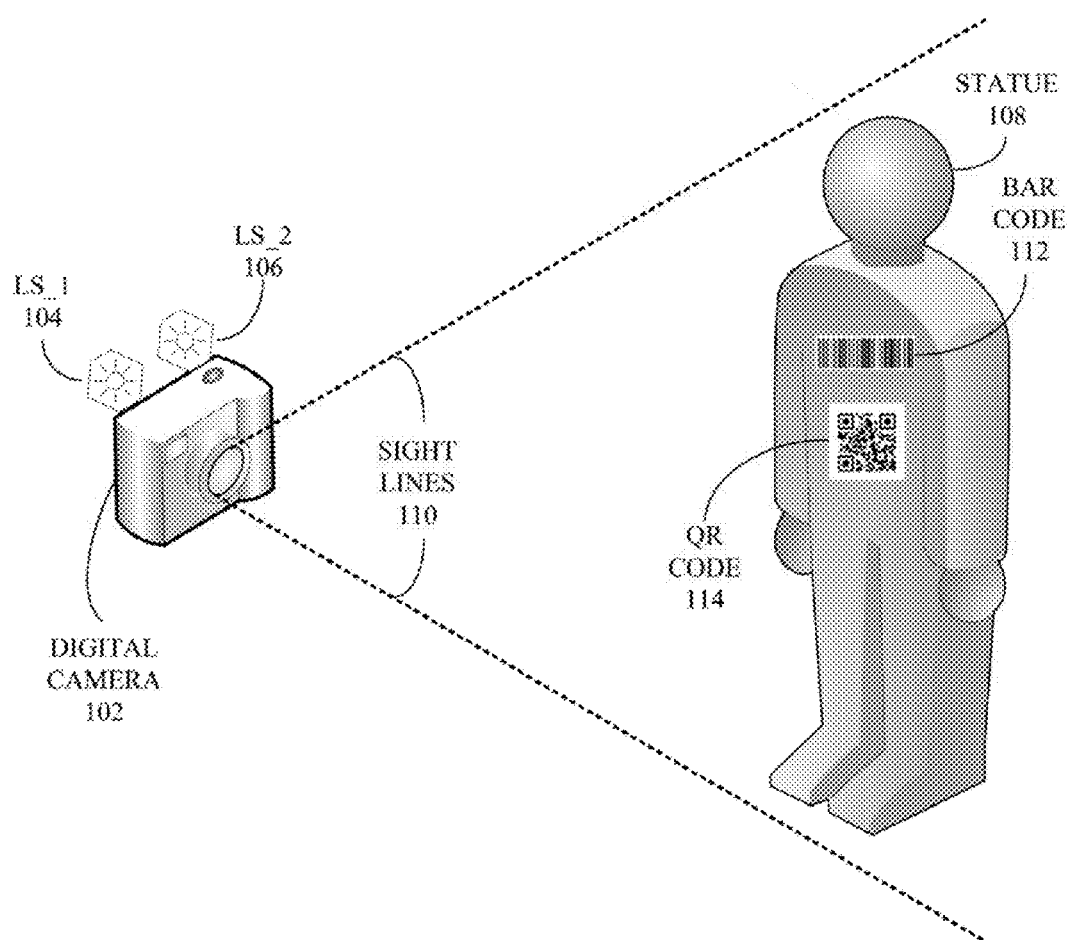
FIG. 1 is a block diagram of a camera that may implement aspects of the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified In the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram of a camera 102 that may implement aspects of the claimed subject matter. Camera 102 is coupled to two (2) light sources, of "flashes," i.e. a LS_1 104 and a LS_2 106. LS_1 104 and LS_2 108 both produce illumination so that camera 102 may capture an image of an object, which in this example is a statue 108 that fall within sight lines 110 of camera 102, LS_1 104 produces illumination in a visible light spectrum, or simply "visual spectrum," and LS_2 106 produces illumination in a non-visual light spectrum, or simply "non-visual spectrum," such as, but not limited to, the ultraviolet or infrared wavelengths.

It should be understood that although the disclosed technology is described with respect to two different light sources, either none or one light sources may be employed. For example, one or more sensors may be sensitive enough to their respective spectrums that no illumination is required to capture an image. A sensor that is sensitive to visual light may not need a flash in some situations. In a similar fashion, a sensor sensitive to the non-visual light spectrum may be used, either with or without a corresponding flash.

Statue 108 has two (2) labels, i.e., a bar code 112 and a Quick Response (QR) code 114. Bar code 112 and QR code 114 are configured to be visible in the non-visual light spectrum and "invisible" in the visual light spectrum. In other words, bar code 112 and QR code 114 are printed with "invisible" ink. In accordance with the claimed subject matter, LS_1 104 is employed by camera 102 to capture a first image of statue 108 in the visual spectrum and LS_2 106 is employed to capture a second image in the non-visual spectrum. The relationship between camera 102 and codes 112 and 114 is explained in more detail below in conjunction with FIGS. 2 and 3.

Figure 2:
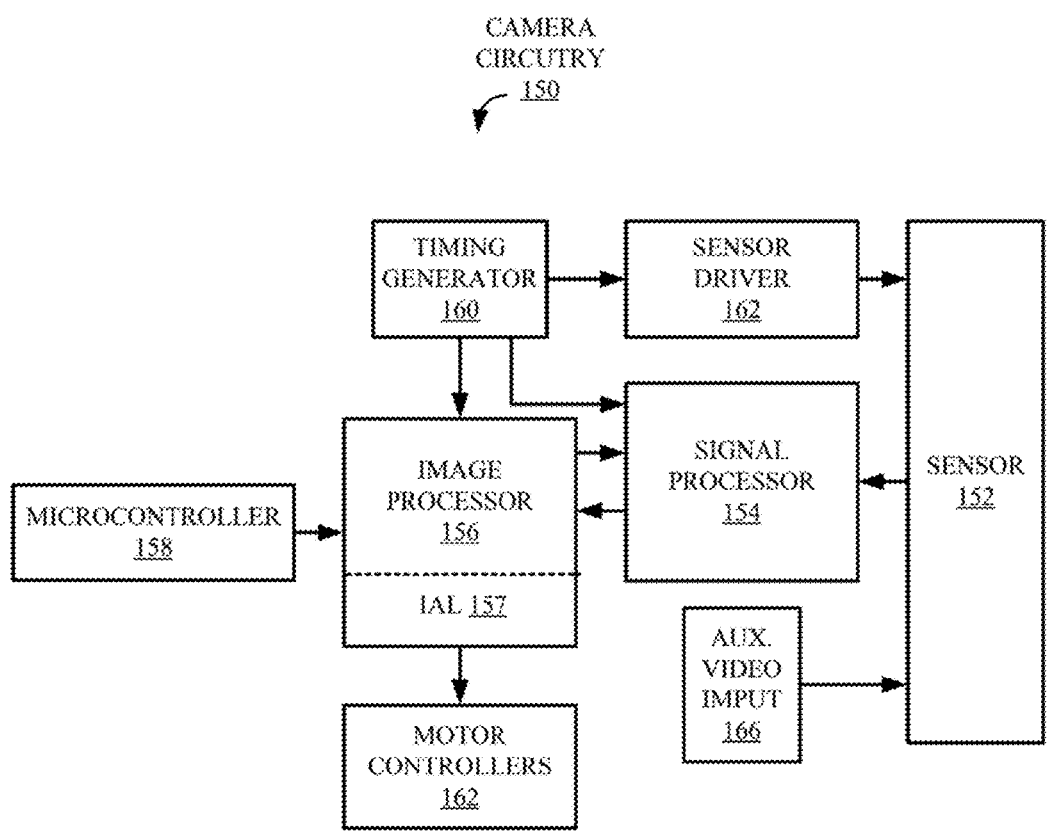
FIG. 2 is a block diagram of a one example of circuitry associated with the camera of FIG. 1.

FIG. 2 is a block diagram of a one example of camera circuitry, or simply "circuitry," 150 that may associated with camera 102 of FIG. 1. Light reflected from an object, which in this example is statue 108 (FIG. 1), is captured by a sensor 152. Sensor 152 transmits a signal to a signal processor 154, which, after processing the signal, transmits a digital signal corresponding to the captured image to an image processor 156. In accordance with the claimed subject matter, image processor 156 includes Image Augmentation Logic (IAL) 157. Although illustrated in conjunction with image processor 156, all or parts of IAL 157 may be implemented as one or more separate components of camera 102. Some processing associated with IAL 157 may even be configured to take place on devices other than camera 102 in a post processing configuration. Processing associated with IAL 155 is described in more detail below in conjunction with FIG. 3. Image processor 156 is controlled by a microcontroller 158 and a timing generator 160 and in turn controls motor controllers 162. Motor controllers 162 control mechanical aspects of camera 102, such as, but not limited to, LS_1 104 (FIG. 1), LS_2 106 (FIG. 1) and a shutter (not shown) that allows light to hit sensor 152.

Timing generator 160 signals a sensor driver 162 that is used to control image capture timing by sensor 152 and coordinates activities of sensor 152 and signal processor 154. Also coupled to sensor 152 is an auxiliary (aux.) video input 166 that enables sensor 152, and therefore camera 102, to capture video images as well as still images. It should be understood that circuitry 150 is used for the purposes of illustration only and that a typical digital camera would be much more complex with either additional or different components. In addition, the claimed subject matter is also applicable to other types of image capture devices such as, but not limited to, video cameras.

Figure 3:
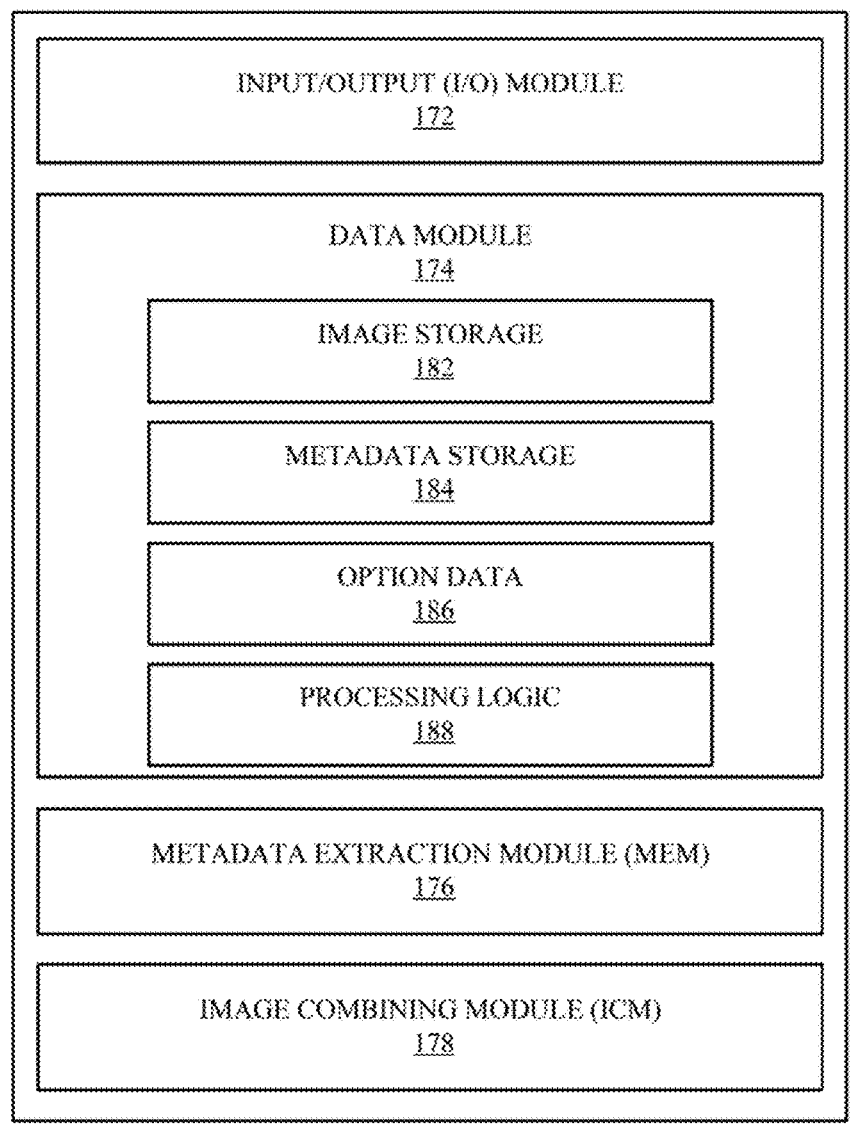
FIG. 3 is a block diagram of Image Augmentation Circuitry (IAL), first introduced in conjunction with FIG. 2.

FIG. 3 is a block diagram of IAL 157, described above in conjunction with FIG. 2, in greater detail. IAL 157 includes an input/output (I/O) module 172, a data module 174, a metadata extraction module (MEM) 176 and an image combining module (ICM) 178. It should be understood that the claimed subject matter can be implemented in many types of software and circuitry but, for the sake of simplicity, is described only in terms of camera 102 (FIG. 1) and IAL 157. Further, the representation of IAL 157 in FIG. 3 is a logical model. In other words, components 172, 174 and 178 may be implemented in software or hardware and configured in many types of devices and configurations, as will be apparent to one with skill in the relevant arts.

I/O module 140 handles any communication IAL 157 has with other components of camera 102. Data module 172 stores information that IAL 157 requires during normal operation. Examples of the types of information stored in data module 172 include image storage 182, metadata storage 184, option data 186 and processing logic 188. Image storage 182 provides storage for both images captured in the visible spectrum, the corresponding image in the non-visible spectrum and the processed image in the visible image that includes information extracted from codes 112 and 114. Metadata storage 184 stores information extracted from codes 112 and 114. Option data 186 stores information that control the operation of IAL 157, including, but not limited to, storage locations and file storage formats. Processing logic 188 stores the code that controls the operation of IAL 157, subject to the configuration parameters stored in option data 186.

Metadata Extraction module 144 extracts information referenced by codes on objects, which in the following example includes the information on bar code 112 and QR code 114 on object 108 as captured by camera 102 in the non-visible spectrum. Image combining module (ICM) 178 takes this information extracted by MEM 174 and associates the information with the corresponding image in the visible spectrum. The image in the visible spectrum is than stored in image storage 182.

Figure 4:
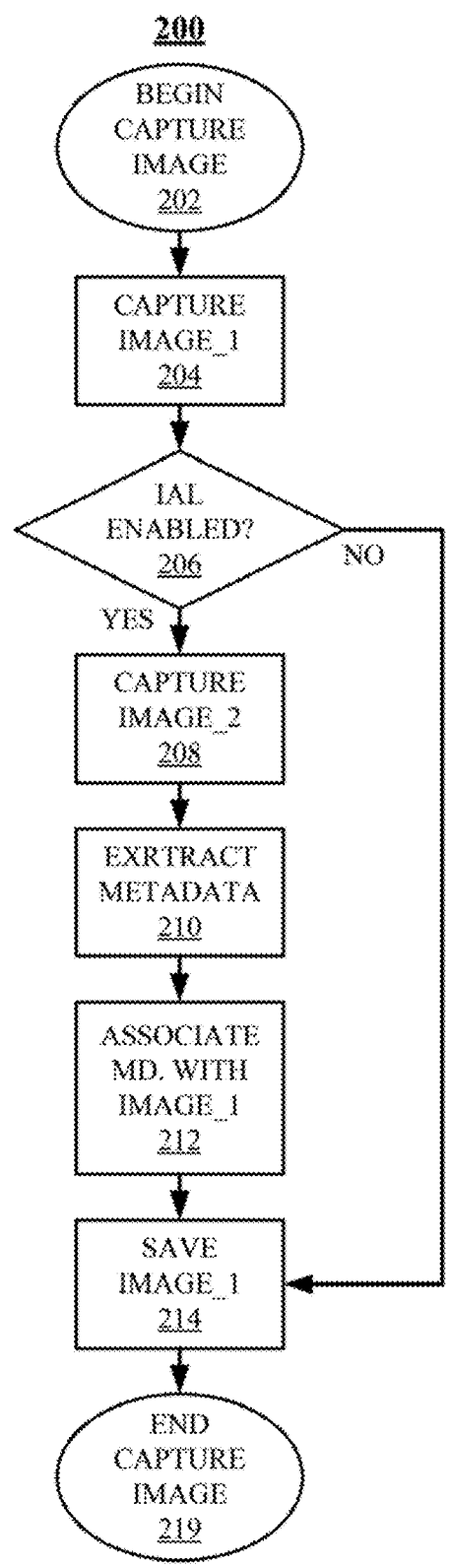
FIG. 4 is a flowchart of one example of a Capture Image process that may implement aspects of the claimed subject matter.

FIG. 4 is a flowchart of one example of a Capture Image process 200 that may implement aspects of the claimed subject matter. In this example, process 200 is associated with logic stored in processing logic 188 (FIG. 3) of IAL 157 (FIGS. 2 and 3) and executed on elements of camera circuitry 150 (FIG. 2).

Process 200 starts in a "Begin Capture Image" block 202 and proceeds immediately to a "Capture Image_1" block 204. During processing associated with block 204, a first image, in the visible light spectrum, is captured by camera 102 (FIG. 1). Depending upon the amount of ambient visible light, LS_1 104 (FIG. 1) may or may not be used to illuminate the scene of which a picture is taken. In this example, a user is taking a picture of statue 108 (FIG. 1). During processing associated with a "IAL Enabled?" block 206, a determination is made as to whether or not IAL 157 has been enabled for this particular picture, or "shot." If so, control proceeds to a "Capture Image_2" block 208. During processing associated with block 208, a second image, in a non-visible light spectrum, is taken. Like the shot with respect to the first image. Depending upon the amount of ambient non-visible light, LS_2 106 (FIG. 1) may or may not be used to illuminate bar code 112 (FIG. 1) and QR code 114 (FIG. 1), which are the target of this particular shot.

During processing associated, with an "Extract Metadata" block 210, metadata associated with bar code 112 and QR code 114 are extracted. The data may actually be stored in bar code 112 and/or QR code 114 or codes 112 and/or 114 may simply provide a cite to a location where the corresponding data is stored. During processing associated with an "Associate Metadata (MD.) with Image_1" block 212, the metadata extracted from the second image during processing associated with block 210 is associated with the first image shot during processing associated with block 208. Once the metadata has been associated with the first image during processing associated with block 212 or, if, during processing associated with block 206, a determination is made that IAL 157 is not enabled, control proceeds to a "Save Image_1" block 214.

During processing associated with block 214, the first image shot during processing associated with block 204 is saved in image storage 182 and, if IAL 157 has been enabled, the extracted metadata is stored in metadata storage 184 so that the stored metadata may be associated with the first image. Finally, control proceeds to an "End Capture Image" block 219 and process 200 is complete.

The terminology used, herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used In this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended, to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   capturing a first image of a first object with a first imaging technology operating at frequencies within the visual spectrum;
   capturing a second image of a second object positioned on the first object with a second imaging technology operating at frequencies outside the visual spectrum, wherein the first imaging technology is different than the second imaging technology and the first object is a different object than the second object;
   extracting content from the second image that is invisible in the first image, wherein the content comprises information about the first object;
   generating a third image by combining the content as metadata and the first image; and
   storing the third image in a non-transitory, computer-readable storage medium.

2. The method of claim 1, further comprising storing the content in conjunction with the first object in the non-visual light spectrum.

3. The method of claim 2, wherein the content is stored in a bar code placed on the first object.

4. The method of claim 2, wherein the content is stored in a Quick Response (QR) code placed on the first object.

5. The method of claim 1, the extracting the metadata comprising:
reading a reference to data stored in an information store from the metadata; and
retrieving the data from the information store.

6. The method of claim 1, wherein the capturing of the first and second images are performed at the same position with respect to the first object.

7. The method of claim 1, wherein the first image is one of a plurality of video images that comprise a video recording and the content is stored in conjunction with the video recording.

8. An apparatus, comprising:
a processor;
a computer-readable storage medium coupled to the processor;
a first imaging capture device operating at frequencies within the visual spectrum;
a second imaging capture device operating at frequencies outside the visual spectrum; and
instructions, stored on the computer-readable storage device and executed on the processor for performing a method, the method comprising capturing a first image of a first object with the first imaging capture device;
capturing a second image of a second object positioned on the first object with the second imaging capture device and the first object is a different object than the second object;
extracting content from the second image that is invisible in the first image wherein the content comprises information about the first object;
generating a third image by combining the first image and the content as metadata in conjunction with the first image; and
storing the third image in the non-transitory, computer-readable storage medium.

9. The apparatus of claim 8, the method further comprising storing the content in conjunction with the first object in the non-visual light spectrum.

10. The apparatus of claim 9, wherein the content is stored in a bar code placed on the first object.

11. The apparatus of claim 9, wherein the content is stored in a Quick Response (QR) code placed on the first object.

12. The apparatus of claim 8, the extracting the metadata comprising:
reading a reference to data stored in an information store from the metadata; and
retrieving the data from the information store.

13. The apparatus of claim 8, wherein the capturing of the first and second images are performed at the same position with respect to the first object.

14. The apparatus of claim 8, wherein the first image is one of a plurality of video images that comprise a video recording and the content is stored in conjunction with the video recording.

15. A computer programming product, comprising:
a non-transitory computer-readable storage medium; and
instructions, stored on the computer-readable storage medium executed on a processor, for performing a method, the method comprising:
capturing a first image of a first object with a first imaging capture device operating at frequencies within the visual spectrum;
capturing a second image of a second object positioned on the first object with a second imaging capture device operating at frequencies outside the visual spectrum and the first object is a different object than the second object;
extracting content from the second image that is invisible in the first image, wherein the content comprises information about the first object;
generating a third image by combining the first image and the content as metadata in conjunction with the first image; and
storing the third image in the non-transitory, computer-readable storage medium.

16. The computer programming product of claim 15, the method further comprising storing the content in conjunction with the first object in the non-visual light spectrum.

17. The computer programming product of claim 16, wherein the content is stored in a bar code placed on the first object.

18. The computer programming product of claim 16, wherein the content is stored in a Quick Response (QR) code placed on the first object.

19. The computer programming product of claim 15, wherein the capturing of the first and second images are performed at the same position with respect to the first object.

20. The computer programming product of claim 15, wherein the first image is one of a plurality of video images that comprise a video recording and the content is stored in conjunction with the video recording.

* * * * *